J. D. ELLISON.
HEADLIGHT FOR AUTOMOBILES.
APPLICATION FILED JAN. 27, 1912.

1,109,743.

Patented Sept. 8, 1914.

Witnesses
Allan Hobson
M. E. Shook

Inventor
John D. Ellison
By Edsen Bros,
Attorneys

UNITED STATES PATENT OFFICE.

JOHN D. ELLISON, OF UNION CITY, TENNESSEE.

HEADLIGHT FOR AUTOMOBILES.

1,109,743.     Specification of Letters Patent.     Patented Sept. 8, 1914.

Application filed January 27, 1912. Serial No. 673,932.

*To all whom it may concern:*

Be it known that I, JOHN D. ELLISON, a citizen of the United States, residing at Union City, in the county of Obion and State of Tennessee, have invented certain new and useful Improvements in Headlights for Automobiles; and I do hereby declare the following to be a full, clear, and exact description of the invention, such as will enable others skilled in the art to which it appertains to make and use the same.

My invention relates to headlights for automobiles, especially for means to turn one of said headlights, namely the one on the inside of the curve, in the direction the vehicle is turning, while the other or outside headlight is retained in its normal position facing directly ahead of the car.

The object of my invention is to make a device of this kind in the simplest possible form, thereby saving expense in manufacture and repair while producing a mechanism which will operate with certainty and be durable.

It will be understood, of course, that my invention is designed for the purpose of preventing accidents which often result from an automobile encountering some obstacle, either at one side of the road or the other, which is not illuminated by stationary headlights which point directly to the front when the car is rounding a curve nor by automatic headlights which move in unison in the direction in which the car is turning. When one headlight is turned in the direction of the curve and the other remains pointed to the front, both sides of the road are well lighted and such accidents are avoided. This is especially true when it is the headlight on the inside of the curve which is turned.

The invention consists in the features of construction and combinations of parts herein described, illustrated in the accompanying drawing and specified in the appended claims.

Figure 1:
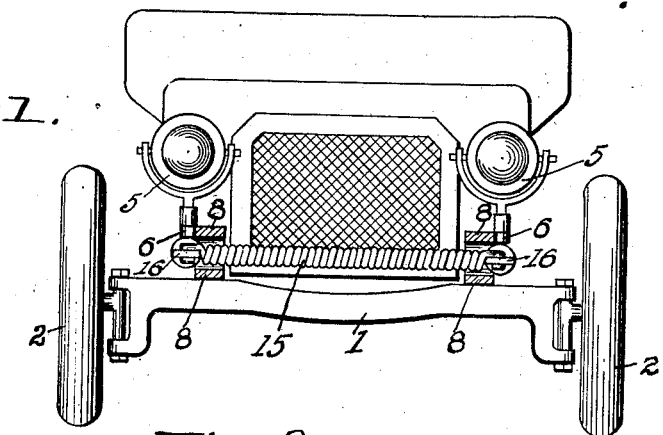
Figure 2:
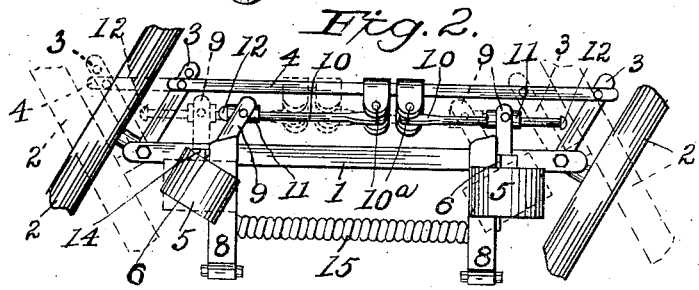
Figure 5:
Figure 3:
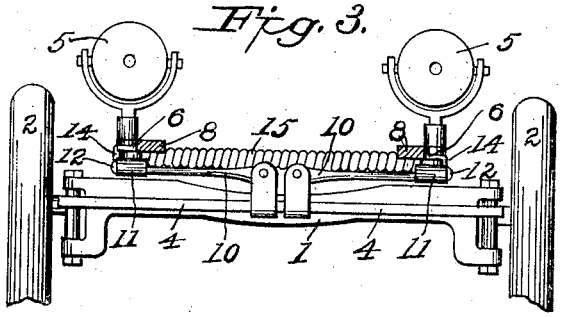
Figure 4:
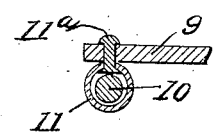

In the accompanying drawing: Figure 1 is a front elevation of an automobile equipped with my automatic headlights, the forward ends of the springs on which the headlights are mounted being broken away to more clearly disclose the connections between the spring and the levers for turning said headlights. Fig. 2 is a plan view of the front axle showing the headlights and their actuating mechanism indicating the positions of the various parts when the car is turning to the right, the positions of said parts when a turn is being made to the left being shown in dotted lines. Fig. 3 is a rear elevation of the front axle and other parts illustrated in Fig. 2. Fig. 4 is a detail sectional view through one of the cuffs illustrated in Fig. 3, showing the means of connection and the rod passing therethrough. Fig. 5 is a side view of one of the lamp brackets.

Referring more particularly to the drawing, 1 designates the front axle of an automobile to which are swiveled the front wheels 2 having rearwardly extending lever arms 3 connected by the usual steering rod 4 for turning said wheels in unison.

The headlights 5 are preferably supported by brackets 6 riveted at 7 or otherwise secured to the front springs 8 of the vehicle. Each headlight is swiveled in its bracket and is provided with a lever arm 9 extending rearwardly thereof near to the vertical plane of the steering or connecting bar 4. As illustrated in Figs. 1 to 5 inclusive of the drawing, said lever arms are connected to said steering bar by means of rods 10 each swiveled as at 10$^a$ at one of its ends to said bar near the center thereof and its other end portion passed through a cuff 11 swiveled at 11$^a$ to one of said arms, the extremity of the rod beyond said cuff being headed or enlarged, as at 12, to prevent it from passing through said cuff. When the steering or connecting bar is actuated to turn the car to the right, as illustrated in solid lines in Fig. 2, the head 12 on the right hand rod 10 will operate to turn its headlight in unison with the wheels, while the left hand rod merely slides through its cuff without turning the corresponding headlight. The operation of the headlight is reversed when the steering bar is actuated to turn the vehicle to the left, as illustrated in dotted lines in Fig. 2.

In order to prevent the headlight on the outside of the curve from turning because of friction between the rod and cuff or otherwise, stops 14, preferably formed on the brackets 6, are arranged to engage the outer edges of the respective lever arms in rear of their pivotal points. The headlights are automatically returned to normal position, facing straight to the front, by a tension spring 15, or its equivalent, extending between, and connected at its opposite extremities to forward extensions 16 on the lever arms 9. Said spring normally holds said lever arms in contact with their stops 14 in which position the headlights face directly toward the front.

I am aware that all automobiles are not built alike and I, therefore, reserve the right to make such changes, in order to adapt my improvements to any and all makes, as may fairly fall within the scope of my invention.

I claim:

1. The combination, with the steering bar of a vehicle, of a pair of swiveled headlights having projecting lever arms, and a rod connecting each of said lever arms to said steering bar each rod having sliding connection with its lever arm in one direction.

2. The combination, with the steering bar of a vehicle, of a pair of swiveled headlights having projecting lever arms, and rods extending in opposite directions between said lever arms and steering bar, the adjacent ends of said rods being attached to the latter and their other ends having sliding connection with the respective lever arms in an outward direction for the purpose specified.

3. The combination, with the steering bar of a vehicle, of a pair of swiveled headlights having projecting lever arms, and rods extending in opposite directions between said lever arms and steering bar, the adjacent ends of said rods being attached to the latter and their other end portions having sliding connection with the respective lever arms in an outward direction, and heads on the outer extremities of said rods whereby said lever arms are moved therewith in an inward direction.

4. The combination, with the steering bar of a vehicle, of a pair of swiveled headlights having projecting lever arms, cuffs swiveled on the latter, and rods extending loosely through said cuffs and having heads adjacent to the same, said rods being also attached to said steering bar for the purpose specified.

5. The combination, with the steering bar of a vehicle, of a pair of swiveled headlights having projecting lever arms, and rods connecting said lever arms to said steering bar and having sliding connection with the former in one direction, and means adapted to engage the lever arm of each headlight for retaining one of the headlights in its normal position during the sliding movement of its connecting rod while the other headlight is being turned by its connecting rod.

6. The combination, with the steering bar of a vehicle, of a pair of swiveled headlights having projecting lever arms, cuffs swiveled on the latter, and rods extending loosely through said cuffs and having heads adjacent to the same, said rods being also attached to said steering bar for the purpose specified, and means for retaining one of the headlights in its normal position during the sliding movement of its connecting rod while the other headlight is being turned by its connecting rod.

7. The combination with the steering bar of a vehicle, of a pair of swiveled headlights having projecting lever arms, each lever arm being provided with a forward extension, rods connecting said lever arms to said steering bar, said rods having sliding connection with the lever arms in one direction, and means connected to said forward extensions of the lever arms to automatically return the headlights to normal position when said steering bar is moved to its normal position.

8. The combination with the steering bar of a vehicle, of a pair of swiveled headlights having projecting lever arms, each lever arm being provided with a forward extension, rods to connect said lever arms with said steering bar, said rods having sliding connection with the lever arms in one direction, a stop adapted to engage the lever arm of each headlight to prevent the accidental movement of said headlight in the opposite direction, and means connected to the forward extension of each lever arm to automatically return said headlights to normal position when the steering bar is moved to its normal position.

9. A device for operating the lamps of a motor car consisting of a plurality of swiveled headlights each pivotally mounted upon a standard, a lever arm connected rigidly with each lamp and extending rearwardly therefrom, and forward extensions to each of said lever arms, a rod having pivotal connection with the steering bar of a vehicle and loosely coupled to a lever arm to actuate the same and its headlight in one direction, and resilient means connected to the forward extension for returning the headlights to their normal position.

In testimony whereof, I affix my signature, in presence of two witnesses.

JOHN D. ELLISON.

Witnesses:
 THAD DHU.
 ROSENA LAWRENCE.